US012521748B2

(12) United States Patent
Rhoades et al.

(10) Patent No.: US 12,521,748 B2
(45) Date of Patent: Jan. 13, 2026

(54) GROUND DEPOSITION MACHINE FOR SLOPING SURFACES

(71) Applicant: Micropply Limited, Altrincham (GB)

(72) Inventors: Anthony David George Rhoades, Altrincham (GB); Samuel Paul Cornish-Evans, Knutsford (GB); Lewis Cassidy, Manchester (GB)

(73) Assignee: Micropply Limited, Cheshire (GB)

( * ) Notice: Subject to any disclaimer, the term of this patent is extended or adjusted under 35 U.S.C. 154(b) by 0 days.

(21) Appl. No.: 18/853,237

(22) PCT Filed: Apr. 6, 2023

(86) PCT No.: PCT/GB2023/050926

§ 371 (c)(1),
(2) Date: Oct. 1, 2024

(87) PCT Pub. No.: WO2023/194739

PCT Pub. Date: Oct. 12, 2023

(65) Prior Publication Data

US 2025/0235887 A1 Jul. 24, 2025

(30) Foreign Application Priority Data

Apr. 6, 2022 (GB) ...................................... 2205018
Apr. 12, 2022 (GB) ...................................... 2205452

(Continued)

(51) Int. Cl.
*B05B 13/04* (2006.01)
*B05B 12/04* (2006.01)

(Continued)

(52) U.S. Cl.
CPC ............ *B05B 13/041* (2013.01); *B05B 12/04* (2013.01); *B05B 13/005* (2013.01); *B05D 1/02* (2013.01)

(58) Field of Classification Search
CPC ...... B05B 13/041; B05B 12/04; B05B 13/005
See application file for complete search history.

(56) References Cited

U.S. PATENT DOCUMENTS

2005/0055142 A1 3/2005 McMurtry et al.
2013/0122186 A1* 5/2013 Hoppel .................... B05D 1/00 118/712
2019/0203432 A1* 7/2019 Schroeder ............... E01C 23/22

FOREIGN PATENT DOCUMENTS

WO 2007018362 A1 2/2007

OTHER PUBLICATIONS

International Search Report and Written Opinion for International Application No. PCT/GB2023/050926 filed Apr. 6, 2023 (15 Pages).

* cited by examiner

*Primary Examiner* — Nathan T Leong
(74) *Attorney, Agent, or Firm* — Hartman Global IP Law; Gary M. Hartman; Domenica N. S. Hartman

(57) ABSTRACT

A spray head arrangement, suitable for use in a ground deposition apparatus, wherein in operation the spray head arrangement is moved linearly along a horizontal mounting rail, the spray head arrangement having: a vertical mounting rail; a second support arm arranged orthogonally to the vertical mounting rail; plurality of nozzles mounted to the second support arm and operable to deposit a material on a ground surface; and a mounting carriage, wherein the mounting carriage has four guide wheels on each of oppositely-disposed first and second sides of the mounting carriage, the four guide wheels on the first side of the mounting carriage being configured to engage oppositely-disposed first and second sides of a track portion of the vertical mounting rail, the four guide wheels on the second side of (Continued)

the mounting carriage being configured to engage oppositely-disposed first and second sides of a track portion of the horizontal mounting rail.

13 Claims, 12 Drawing Sheets

(30) Foreign Application Priority Data

| | | |
|---|---|---|
| May 31, 2022 | (GB) | 2208013 |
| Sep. 7, 2022 | (GB) | 2213059 |
| Oct. 3, 2022 | (GB) | 2214496 |

(51) Int. Cl.

| | |
|---|---|
| ***B05B 13/00*** | (2006.01) |
| ***B05D 1/02*** | (2006.01) |

GROUND DEPOSITION MACHINE FOR SLOPING SURFACES

CROSS REFERENCE TO RELATED APPLICATIONS

This application claims the benefit of PCT/GB2023/050926 filed Apr. 6, 2023, having a priority claim to British Patent Application Nos. GB 2205018.1 filed Apr. 6, 2022, GB 2205452.2 filed Apr. 12, 2022, GB 2208013.9 filed May 31, 2022, GB 2213059.5 filed Sep. 7, 2022, and GB 2214496.8 filed Oct. 3, 2022. The contents of these prior patent documents are incorporated herein by reference.

The present invention relates to an improved deposition arrangement for an Autonomous Deposition Robot (ADR) and/or for a detachable, deposition accessory for an ADR of a type equipped to deposit materials such as ink and paint, but may equally deposit sand, seed, fertiliser, or other ground treatments onto a ground surface or for injection under pressure Into a ground surface. Specifically, an improved deposition arrangement that overcomes issues related to printing on sloped surfaces.

BACKGROUND

Ground marking is typically carried out manually. It requires significant pre-planning, the manufacture of pre-ordered plastic stencils, and large teams of workers to decipher instructions, prepare, layout, and complete a site for marking. Where marking is required such as for logos, safety or hazard signs, the complex make-up of these images means that difficulties persist to print any image, any size, any colour, directly onto any ground surface without the significant cost of time, expense and compromise in image attributes, such as resolution.

One approach to automating ground marking is found in US 2005/0055142 A1 in which a turf marker comprises a ground maintenance vehicle adapted to both mow and store grass as well as carry a marking device that includes a delivery system for applying a marking material to the ground. Dispensing devices for putting down marking materials are provided in the form of boxes requiring mechanisms that require to be driven such as a motor, electric, air or another fluid motor.

One approach to scalable autonomous ground marking is found in the Applicant's co-pending patent "Ground Printing Machine", Micropply Limited, PCT/GB2021/052671, which discloses an ADR machine capable of ground printing and which uses the tiling of segments to cover a large image print area.

Another approach is found in Pixelrunner's application US2019381529, which discloses using a single fixed sprayer arm with numerous nozzle assemblies arranged next to one another. Autonomous Vehicles may be completely autonomous (i.e. free from human operation and/or supervision) or may require at least partial human operation and/or supervision depending on the application.

SUMMARY OF INVENTION

According to a first aspect of the present invention, there is provided a spray head arrangement, suitable for use in a ground deposition apparatus, wherein in operation the spray head arrangement is moved linearly along a horizontal mounting rail, the spray head arrangement comprising: a vertical mounting rail; a second support arm arranged orthogonally to the vertical mounting rail; plurality of nozzles mounted to the second support arm and operable to deposit a material on a ground surface; and a mounting carriage, wherein the mounting carriage comprises: four guide wheels on a first side of the mounting carriage, the four guide wheels on the first side of the mounting carriage comprising two guide wheels configured to engage a first side of a track portion of the vertical mounting rail and two guide wheels configured to engage with a second side of the track portion of the vertical mounting rail opposite the first side of the track portion of the vertical mounting rail; and four guide wheels on a second side of the carriage opposite the first side of the carriage, the four guide wheels on the second side of the carriage comprising two guide wheels configured in operation to engage with a first side of a track portion of the horizontal mounting rail and two guide wheels configured to engage with a second side of the track portion of the horizontal mounting rail opposite the first side of the track portion of the horizontal mounting rail.

Preferably, wherein the carriage further comprises two guide wheels on a second side of the carriage opposite the first side of the carriage, the two guide wheels on the second side of the carriage comprising one wheel configured to engage a first side of a track portion of the horizontal mounting rail and one wheel configured to engage with a second side of the track portion of the horizontal mounting rail opposite the first side of the track portion of the horizontal mounting rail.

Further preferably, wherein each spray nozzle of the plurality of spray nozzles is coupled to a separate respective deposition material cartridge.

Preferably, wherein each spray nozzle is coupled to the separate respective deposition material cartridge via flexible tubing to accommodate movement of the spray nozzles relative to the respective deposition material cartridges.

Further preferably, wherein the spray head arrangement further comprises a first motor, and a pulley and a tension belt, wherein the first motor which drives a pulley, which in turn drives a tension belt and which are operable to move the spray head arrangement along the horizontal mounting rail.

Preferably, wherein the tension belt, is held in place by two guide wheels configured in operation to engage with a first side of a track portion of the horizontal mounting rail, and is fixed in place at each end of the horizontal rail by fixings.

Further preferably, wherein the spray head arrangement further comprises a second motor, and a lead screw, wherein the second motor drives the lead screw to move the spray head arrangement along the vertical rail.

Preferably, wherein the print nozzles are arranged symmetrically around the position of the vertical rail.

According to a second aspect of the present invention, there is provided an autonomous ground printer, wherein the autonomous ground printer is configured to travel in a first direction over the ground surface, the autonomous ground printer comprising the spray head arrangement of any preceding claim.

According to a third aspect of the present invention, there is provided a method of marking a ground surface using a ground printer according to the second aspect, the method comprising: moving the ground printer in the first direction over the ground surface; and moving the plurality of spray nozzles on the ground printer in a second direction, substantially orthogonal to the first direction.

Preferably further comprising the step of moving the plurality of spray nozzles on the ground printer in the third direction, substantially orthogonal to the first direction and substantially orthogonal to the second direction.

Further preferably comprising the step of controlling a plurality of valves, each valve being connected between a respective paint cartridge and a respective spray nozzle, to deposit paint on the ground surface below the respective spray nozzle.

The particular arrangement in the first aspect of the two wheels and tension belt arrangement with the centrally placed x-axis motor, being particularly suitable for use on surfaces that are sloped. This is because the tension pully slack is maintained across the width of the carriage whilst operating with a print head that is not level with the plane of gravity. Specifically, when x-axis motor is operating to pull the print head up when sloped, will be working harder than when the print head is being moved down the slope. In such cases, the tension belt may have slack and/or tension issues which are compensated for by the balance of the two wheels acting either side of the fixing point of the x-axis motor.

The specific arrangement of the of the spray head arrangement, horizontal rail and tubing carrier also provides advantages over the systems and methods known art, as they can be adjusted to fit any width deposition apparatus by the simple adjustment of the horizontal rail, tubing carrier and as such, flexible tubing.

In some examples, the autonomous deposition machine is connected to a cloud system. Connection to a cloud system allows the user to achieve functionality anywhere, for example over the air fault diagnostics, real-time print management, vast secure storage and the means to operate robots anywhere in the operator's network. Use of a cloud system allows the collection of data which can aid in machine learning functionality, improve robot diagnostics, data aggregation and secure communication links between the edge, the cloud and all data processing devices as required. Use of a cloud-based system is built around the user to achieve functionality anywhere, over the air fault diagnostics, real-time print management, vast secure storage and the means to operate robotic printers anywhere in the operator's network.

Thus, there is provided an improved high-resolution grand-scale accuracy of ground printing and deposition systems. Furthermore, delivering navigational accuracy for a ground marking system ensuring flexibility, scalability, ease-of-use, and robustness for the ground marking systems. With these elements in place, ADRs such as the one disclosed in this application can fully satisfy even the most extreme scale market demands such as 'full pitch' print activations used in the NFL (National Football League).

BRIEF DESCRIPTION OF THE FIGURES

Embodiments of the invention will now be described by way of example only and with reference to the accompanying drawings, in which.

The present techniques will be described more fully hereinafter with reference to the accompanying drawings, Like numbers refer to like elements throughout, Parts of the autonomous ground printer are not necessarily to scale and may just be representative of components of the ground print machines, or other described entities.

DETAILED DESCRIPTION

Figure 1:
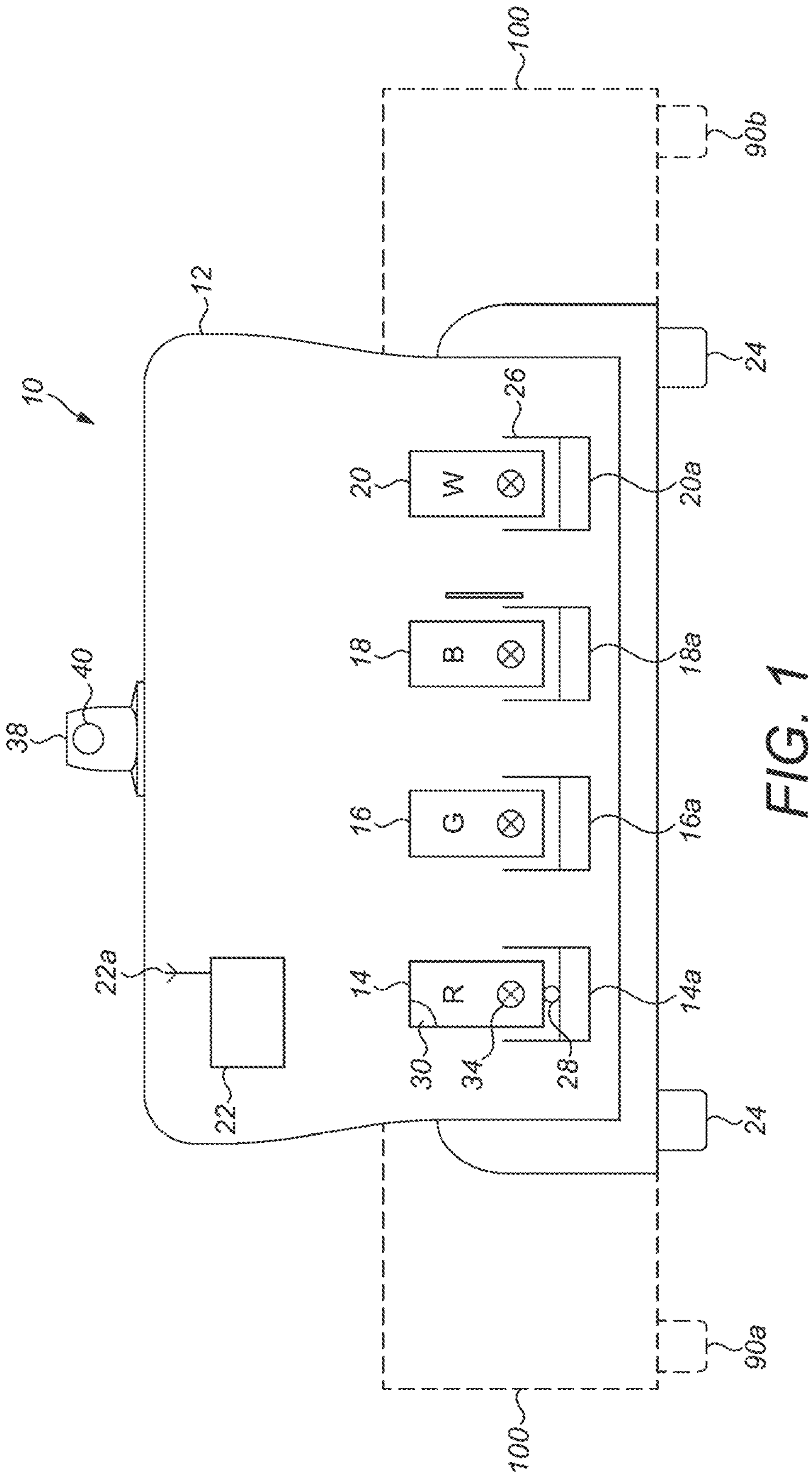
FIG. 1 is a schematic diagram of an autonomous ground deposition robot coupled to a detachable extra wide print rack, according to one embodiment of the present invention.

Referring to FIG. 1, there is illustrated a schematic diagram of an autonomous ground deposition robot 10, which comprises an outer case 12 cut away to reveal an array of primary packaging 14, 16, 18 and 20. The primary packaging 14, 16, 18 and 20 comprises ink held within a bag (not shown in FIG. 1), with primary packaging 14, 16, 18 and 20 comprising a red ink R, a green ink G, a blue ink B and a white ink W, respectively. Each primary packaging 14, 16, 18 and 20 is supported on a weight measuring plate connected to an on-board control system 22.

The on-board control system 22 further comprises a transceiver (not shown) for communication with remote resources, such as the cloud (not shown in FIG. 1), for example over a wireless communication link.

Each weight measuring plate is an Integral part of a frame 14*a*, 16*a*, 18*a* and 20*a* capable of holding the primary packaging 14, 16, 18, 20 firmly in place and comprises a load sensor arrangement 28 for registering the presence of the primary packaging 14, 16, 18, 20 when firmly in place in their respective frames.

As best seen in Figure S, a flexible ink bag 32 comprises an airtight valve outlet 34 sealed to the flexible ink bag 32 with the appropriate connection part for secure connection to a hose 36. The hose 36 may also be a tube, piping, or any suitable means to transport the material for deposition.

S The autonomous ground deposition robot 10 further comprises wheels 24 for movement, a position sensor 38 and a laser 40. Position sensor 38 may comprise a Global Positioning Device for navigation or the autonomous ground deposition robot 10 may use triangulation with known positioning reflectors and the laser 40 for positioning. Other navigational methods are described in the Applicant's co-pending applications.

In some examples, the system controller 22 of each display screen autonomous display screen apparatus 10 may include processing circuitry, control circuitry, and storage (e.g., RAM, ROM, hard disk, a removable disk, etc.). system controller 22 may include an input/output, I/O, path. The I/O path may provide device information, or other data, over a local area network (LAN) or wide area network (WAN), and/or other content and data to control circuitry, which Includes processing circuitry and storage. Control circuitry may be used to send and receive commands, requests, signals (digital and analogue), and other suitable data using I/O path. 1/O path is connected to control circuitry (and specifically processing circuitry) to one or more communications paths. As referred to herein, the phrase "electronic storage device" or "storage device" should be understood to mean any device for storing electronic data, computer software, or firmware, such as random-access memory, read-only memory, hard drives, solid-state devices, quantum storage devices, or any other suitable fixed or removable storage devices, and/or any combination of the same. Non-volatile memory may also be used (e.g., to launch a boot-up routine and other instructions).

There is also shown in FIG. 1 an extra wide detachable print head accessory 100, wherein the detachable print head accessory 100 is connected to the autonomous ground deposition robot 10 by a magnetic coupling means (as shown in FIG. 4) and is supported by an extra set of wheels 90*a*, 90*b*. The extra wide detachable print head accessory 100 is described further with reference to FIG. 2.

Figure 2:
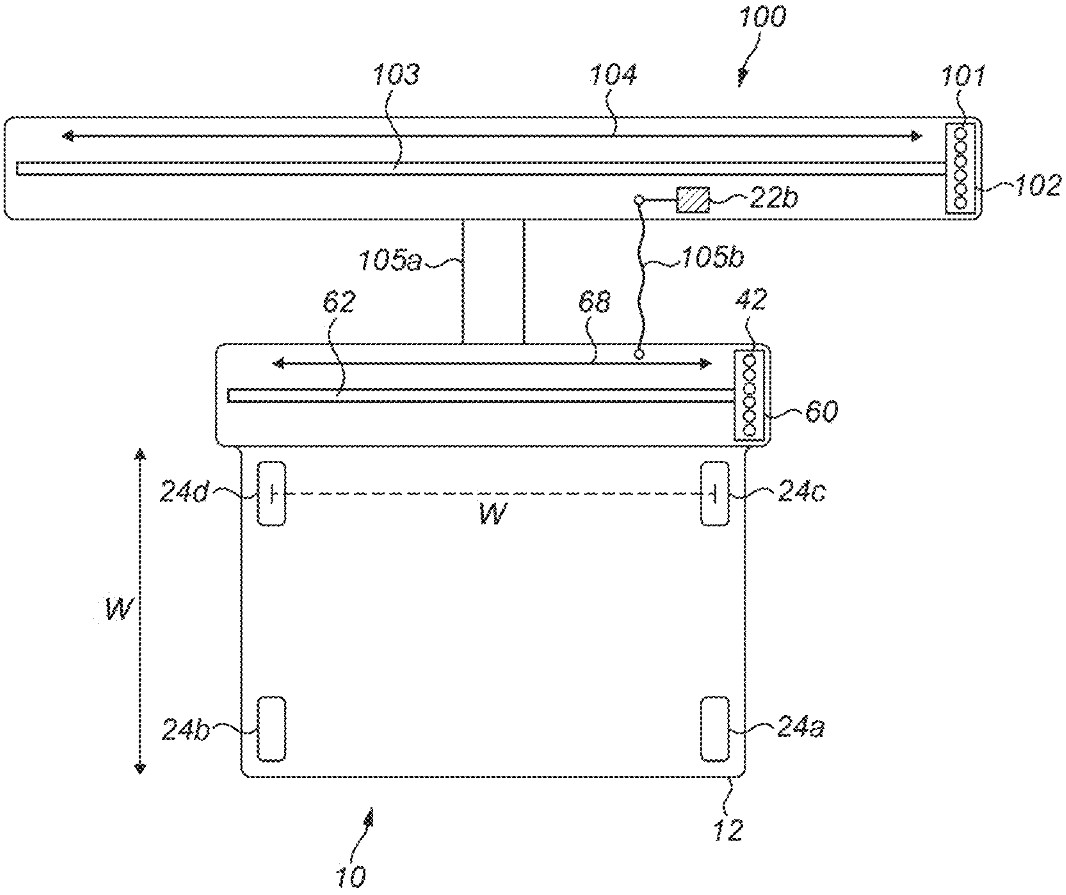
FIG. 2 is a plan view of the ground deposition robot, coupled to a detachable extra wide print rack, of FIG. 1.
Figure 3:
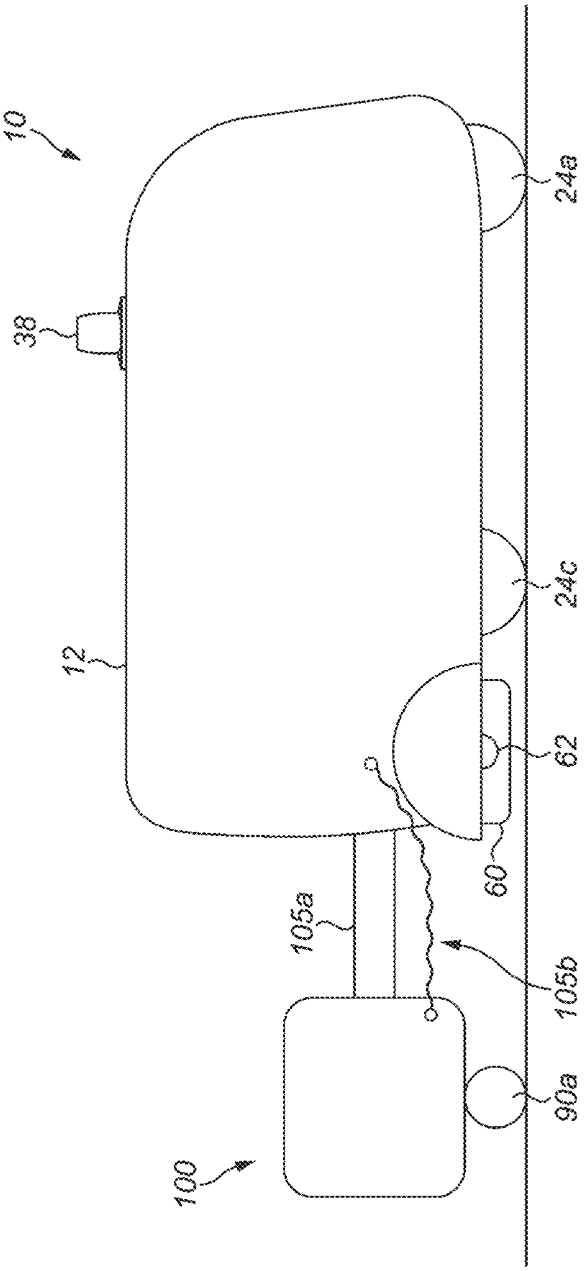
FIG. 3 is a side elevation of the ground deposition robot, coupled to a detachable extra wide print rack, of FIGS. 1 & 2.

FIG. 2 is a plan view and FIG. 3 is a side elevation of the autonomous ground deposition robot 10, coupled to an extra wide detachable print head accessory of the present invention. In both FIGS. 2 and 3, there is shown the autonomous ground deposition robot 10, comprising a case 12 held securely by a chassis supporting the ground wheel arrangement 24 with an internal print head 60 on a traverse guide 62, the traverse guide 62 permitting movement of the print head 60 beyond the width W of the ground wheel arrangement 24, along the length of the standard operation print width 68 (sometimes collectively referred to as a deposition arrangement). A nozzle array may be attached to the print head 60. The nozzles may be fixed and the print head 60 is moveable. The print head 60, via the print guide 62, may be moveable along the length of a print width 68, which is the area the print head is capable of printing in 'normal' operation, that is without the attachment of the extra wide detachable print head accessory 100 of the present invention.

As best shown in FIG. 2, the ground wheel arrangement 24 (also referred to as a locomotion arrangement) further comprises wheels 24*a*, 24*b*, 24*c* and 24*d* to steer the autonomous ground deposition robot 10 along a path to affect the printing, and this may be under the control of a print file that can be loaded into the on-board control system such as may be contained communications module 22, over the cloud (not shown).

In the present example, it will be appreciated that the cloud may comprise any suitable data processing device or embedded system which can be accessed from another platform such as a remote computer, content aggregator or cloud platform which receives data posted by the autonomous ground deposition robot 10. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some examples, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some examples, or the system controller 22 (FIG. 1) or cloud executes instructions for each autonomous ground deposition robot 10.

In the present example, each autonomous ground deposition robot 10 is configured to connect with the cloud or the edge device to push data thereto, as well as receive data. It will be appreciated that the autonomous ground deposition robot 10) may connect to the cloud or the edge, e.g. via the internet, using one or more nodes/routers in a network e.g. a mesh network. The connection may be one or more networks including the Internet, a mobile phone network, mobile voice or data network (e.g., a 3G, 4G, 5G or LTE network), mesh network, peer-to-peer network, cable network, cable reception (e.g., coaxial), microwave link, DSL reception, cable internet reception, fibre reception, over-the-air infrastructure or other types of communications network or combinations of communications networks. The autonomous display screen apparatus 10 may be coupled to a secondary communication network (e.g., Bluetooth, Near Field Communication, service provider proprietary networks, or wired connection) to push data thereto, as well as receive data. Paths may separately or together include one or more communications paths, such as a satellite path, a fibre-optic path, a cable path, a path that supports Internet communications, free-space connections (e.g., for broadcast or other wireless signals), or any other suitable wired or wireless communications path or combination of such paths.

There is shown an extra wide detachable print head accessory 100, which comprises an extra wide traverse guide 103, a second print head arrangement 102 and an extra nozzle array 101, in accordance with an embodiment of the present invention. The extra wide traverse guide 103 permits movement of the second print head arrangement 102 along the length of an extra wide print width 104 and as shall be described in further detail with reference to FIGS. 6 to 10.

Wherein the detachable print head accessory 100 is connected, or coupled, to the chassis of the autonomous ground deposition robot 10 by a magnetic coupling 105*a*. The magnetic coupling 105*a* being powerful enough and strong enough to keep the detachable print head accessory 100 attached securely enough to minimise any lateral or vibrational movement between the detachable print head accessory 100 and the autonomous ground deposition robot 10 takes the form of an angled metal bracket surrounding a metal contact point, which completes an electrical connection between autonomous ground deposition robot 10 and detachable print head accessory 100.

The magnetic connection 105*a* may be any suitable form of an angled metal bracket surrounding a metal contact point, which completes an tight coupling between the autonomous machine and the deposition accessory. In a similar way, the magnetic connection 105*a* may also comprise electrical contacts for passing data and/or power.

Also connecting the detachable print head accessory 100 to the autonomous ground deposition robot 10 is an umbilical 105*b*, wherein the umbilical 105*b* further comprises a serial data cable, a 10-amp power cable and 6 hydraulic lines (not shown). The umbilical 105*b* is connected to the autonomous ground deposition robot 10 via a male/female socket which is mounted on a mounting plate on the underside of the autonomous ground deposition robot 10 (not shown). Although any suitable connection means can be used for the specific parent/child arrangement needed.

The serial data cable is connected to a sub-controller 22*b*, which further comprises an application processor (not shown), which comprises software code about the detachable print head accessory 100. The software code comprises key usage variables and information about the detachable print head accessory 100, which when the umbilical 105*b* is connected, the Information is uploaded to the autonomous ground deposition robot 10 such that the autonomous ground deposition robot 10 can operate the detachable print head accessory 100. Thus, the detachable print head accessory 100 has independent processing capability and can carry out tasks that the 'parent' autonomous ground deposition robot 10 gives it.

Once the detachable print head accessory 100 is coupled to the autonomous ground deposition robot 10, the software loaded on the application processor of the sub-controller 22*b* may also carry out such activities as to check the detachable print head accessory 100 is authorised and/or is compatible to be used with the autonomous ground deposition robot 10.

As mentioned, the umbilical 105*b* also comprises hydraulic lines (not shown), which are connected to a reciprocal connector (not shown) on the underside of the autonomous ground deposition robot 10. When these hydraulic lines are connected and the detachable print head accessory 100 software is uploaded as previously mentioned, then the operation of the internal print head 62 (as described in FIGS. 1 to 3) is overridden and the internal print head 62 is now out of operation.

As such, the autonomous ground deposition robot 10 can control the detachable print head accessory 100 and specifically, paints or deposition materials can be directly pumped to the nozzles in the extra nozzle array 101 of the print head 102 of the detachable print head accessory 100. Via the serial data connection (not shown), the autonomous ground deposition robot 10 may also gather performance diagnostics of the detachable print head accessory 100, such as faults, error messages and or consumption of materials.

Figure 4A:
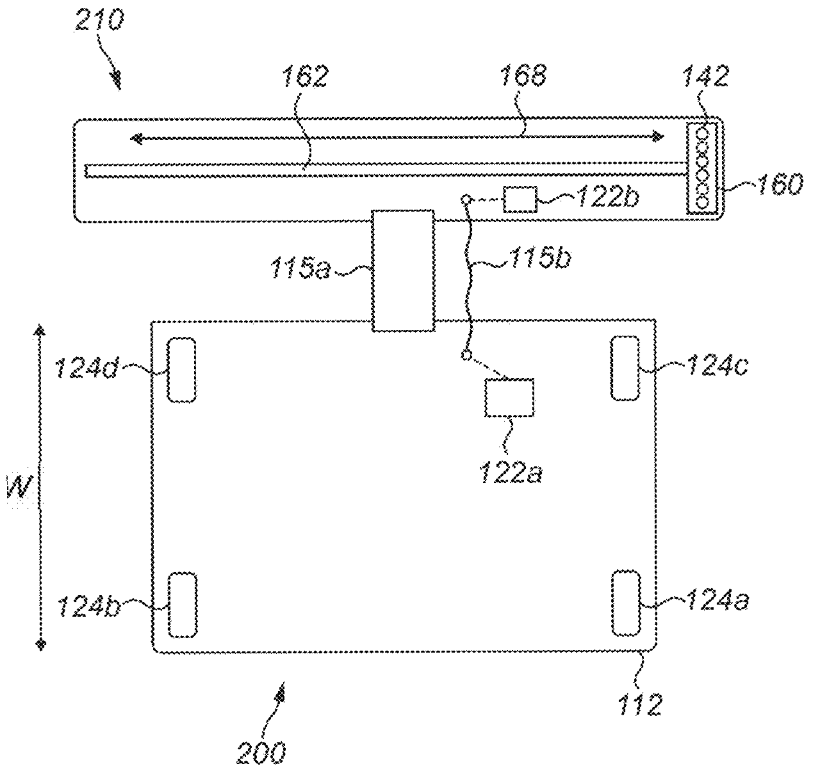
FIGS. 4*a* and 4*b* are a side view and a plan view of a ground deposition robot, coupled to a detachable print rack, according to a second embodiment of the present invention.
Figure 4B:
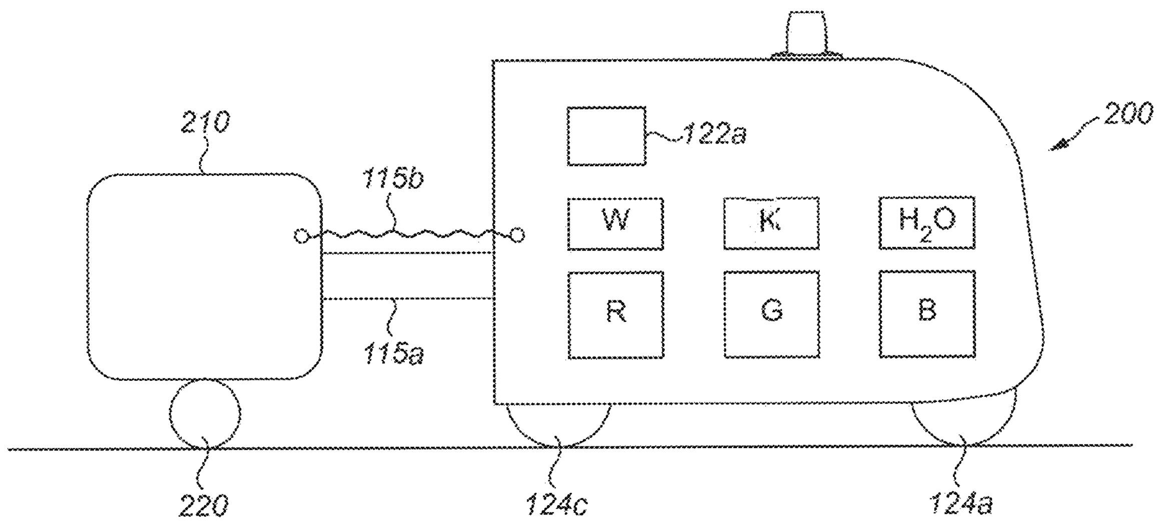

FIG. 4*a* is a plan view and FIG. 4*b* is a side elevation of the autonomous ground deposition robot, coupled to a detachable print head accessory, according to a second embodiment of the present invention. In both FIGS. 4*a* and 4*b*, there is shown an autonomous ground deposition robot 200, comprising a case 112 held securely by a chassis supporting the ground wheel arrangement 124.

As best shown in FIG. 4*a*, the ground wheel arrangement 124 further comprises wheels 124*a*, 124*b*, 124*c* and 24*d* to steer the autonomous ground deposition robot 200 along a path to affect the printing, and this may be under the control of a print file that can be loaded into the onboard control system such as may be contained in communications module 122*a*, as further described with reference to the Applicants' co-pending applications.

There is also shown a detachable print head accessory 210, which comprises a traverse guide 162, a print head arrangement 160 and nozzle array 142. The traverse guide 162 permits movement of the print head arrangement 142 along the length of a print width 168. Wherein the detachable print head accessory 210 is connected, or coupled, to the chassis of the autonomous ground deposition robot 200 by a magnetic connection 115*a*. The magnetic connection 115*a* being powerful enough and strong enough to keep the detachable print head accessory 210 attached securely enough to minimise any lateral or vibrational movement between the detachable print head accessory 210 and the autonomous ground deposition robot 200.

Also connecting the detachable print head accessory 210 to the autonomous ground deposition robot 200 is an umbilical 115*b*, wherein the umbilical 115*b* further comprises a serial data cable, a 10-amp power cable and 6 hydraulic lines (not shown). The umbilical 115*b* is connected to the autonomous ground deposition robot 200 via a male/female socket which is mounted on a mounting plate on the underside of the autonomous ground deposition robot 200 (not shown). Although any suitable connection means can be used for the specific parent/child arrangement needed.

The serial data cable is connected to a sub-controller 122*b*, which further comprises an application processor (not shown), which comprises software code about the detachable print head accessory 210. The software code comprising key usage variables and information about the detachable print head accessory 210, which when the umbilical 115*b* is connected, the information is uploaded to the autonomous ground deposition robot 200 such that the autonomous ground deposition robot 200 can operate the detachable print head accessory 210. Thus, the detachable print head accessory 100 has independent processing capability and can carry out tasks that the 'parent' autonomous ground deposition robot 200 gives it.

Once the detachable print head accessory 210 is coupled to the autonomous ground deposition robot 200, the software loaded on the application processor of the sub-controller 122*b* may also carry out such activities as to check the detachable print head accessory 210 is authorised and/or is compatible to be used with the autonomous ground deposition robot 200.

As mentioned, the umbilical 115*b* also comprises hydraulic lines (not shown), which are connected to a reciprocal connector (not shown) of the autonomous ground deposition robot 200. As such, the autonomous ground deposition robot 200 can control the detachable print head accessory 210 and specifically, paints or deposition materials can be directly pumped to the nozzle array 142 of the print head 62 of the detachable print head accessory 210. Via the serial data connection (not shown), the autonomous ground deposition robot 200 may also gather performance diagnostics of the detachable print head accessory 210, such as faults, errors messages and or consumption of materials.

Although shown as such in FIGS. 1 to 4*b*, the detachable print head accessory 100 does not necessarily have to be symmetrical around the centre of the autonomous ground deposition robot 10, although for load balancing reasons this may be the most appropriate arrangement for the function being carried out. Using the umbilical 105*b*, 115*b*, many different accessories could be connected to the autonomous ground deposition robots 10, 200, though only if the accessory has a matching connector, with a matching serial cable, power feed and suitable hydraulic lines to match the connector and which are all suitable for the deposition materials being housed in the autonomous ground deposition robots 10, 200, ready for deposition.

Figure 5:
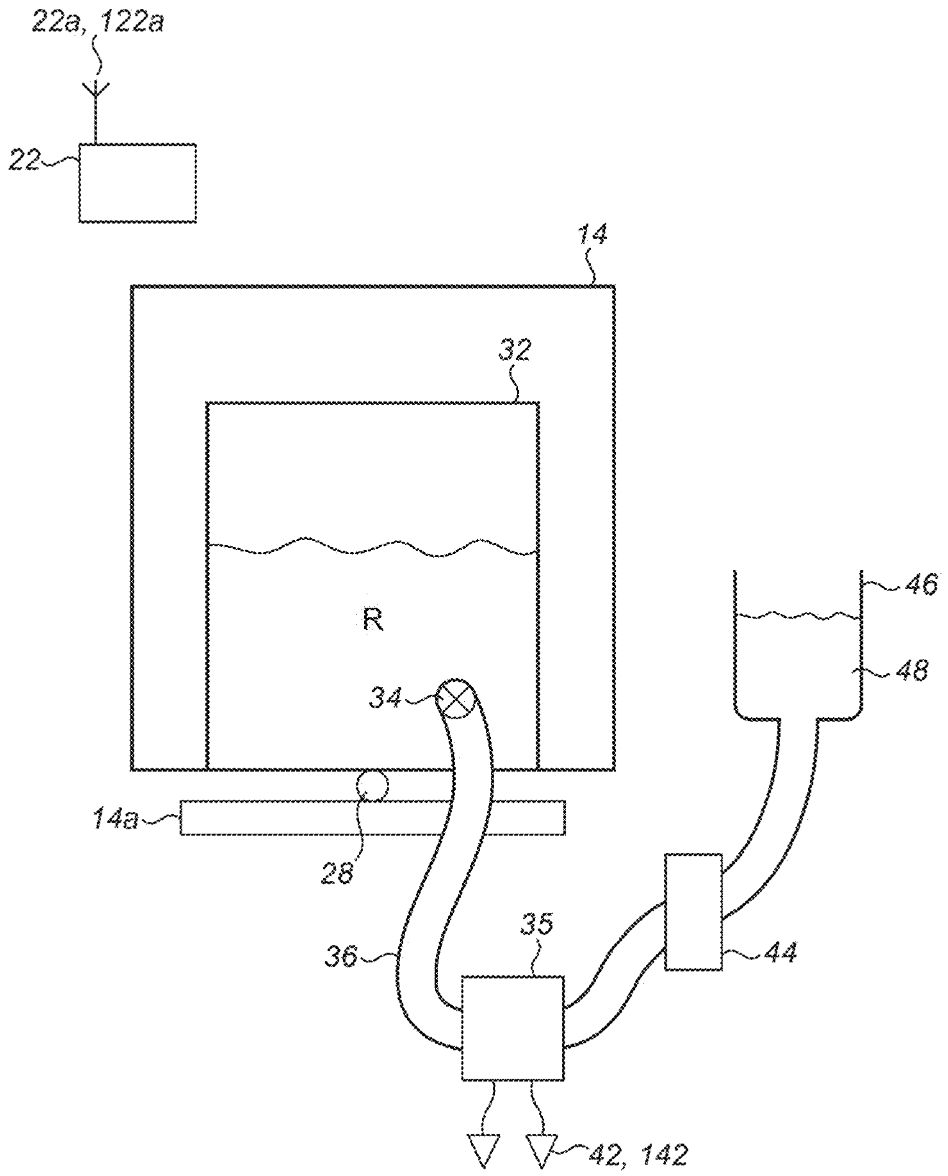
FIG. 5 is a schematic diagram of primary packaging comprising a flexible ink bag with a hose which can be coupled to the nozzle arrays of the autonomous ground deposition robots of any of FIGS. 1 to 4.

Turning to FIG. 5, the primary packaging 14 comprising the flexible ink bag 32 with the hose 36 is connected to a nozzle array 42 via an actuator pump 35. In the embodiment as described with reference to FIGS. 1 to 3, without the attachment of the detachable print head accessory 100, the nozzle array 42 acts as the means to deposit the material for deposition. Any suitable nozzle, nozzle array or means to deposit the material, depending on the actual material to be deposited, may be used, when in an 'uncoupled' mode of operation.

When used with the embodiment as described with reference to FIGS. 4*a* and 4*b*, with the attachment of the detachable print head accessory 100, the nozzle array 142 (of FIG. 4*a*) acts as the means to deposit the material for deposition.

Each ink bag of the primary packaging 14, 16, 18 and 20 will have a hose 36 and valve 34 to connect to the nozzle array 42, 142 via the actuator pump 35. The autonomous ground deposition robot 10, 200 may have a single actuator pump 35 for all primary packaging/ink bag/hose (14,16,18, 20/32/36), or there may be multiple actuator pumps, i.e. one for each primary packaging/ink bags/hose (14,16,18,20/32/36). Each nozzle of the nozzle array 42, 142 may be designated for each primary packaging/ink bag/hose (14,16,18,20/32/36) present, so that each nozzle is for deposition of only the material held in each primary packing/ink bag (14,16,18,20/32).

Bags 32 may contain different colours of marking materials, or a chemical to deposit on the ground, such as a herbicide, pesticide, insecticide, paint, ink, coloured material, powder, fertilizer, plant growth aid or water, or the like provided that a compatible hose 36 and nozzle arrays 42, 142 are attached. The hose 36 is connected to a manifold 44 connected to a tank 46 containing chemical liquids 48 which serve a variety of purposes. The chemical liquids 48 may be used to flush the hose 36 and nozzles 42, as described in the Applicants' co-pending applications.

Figure 6A:
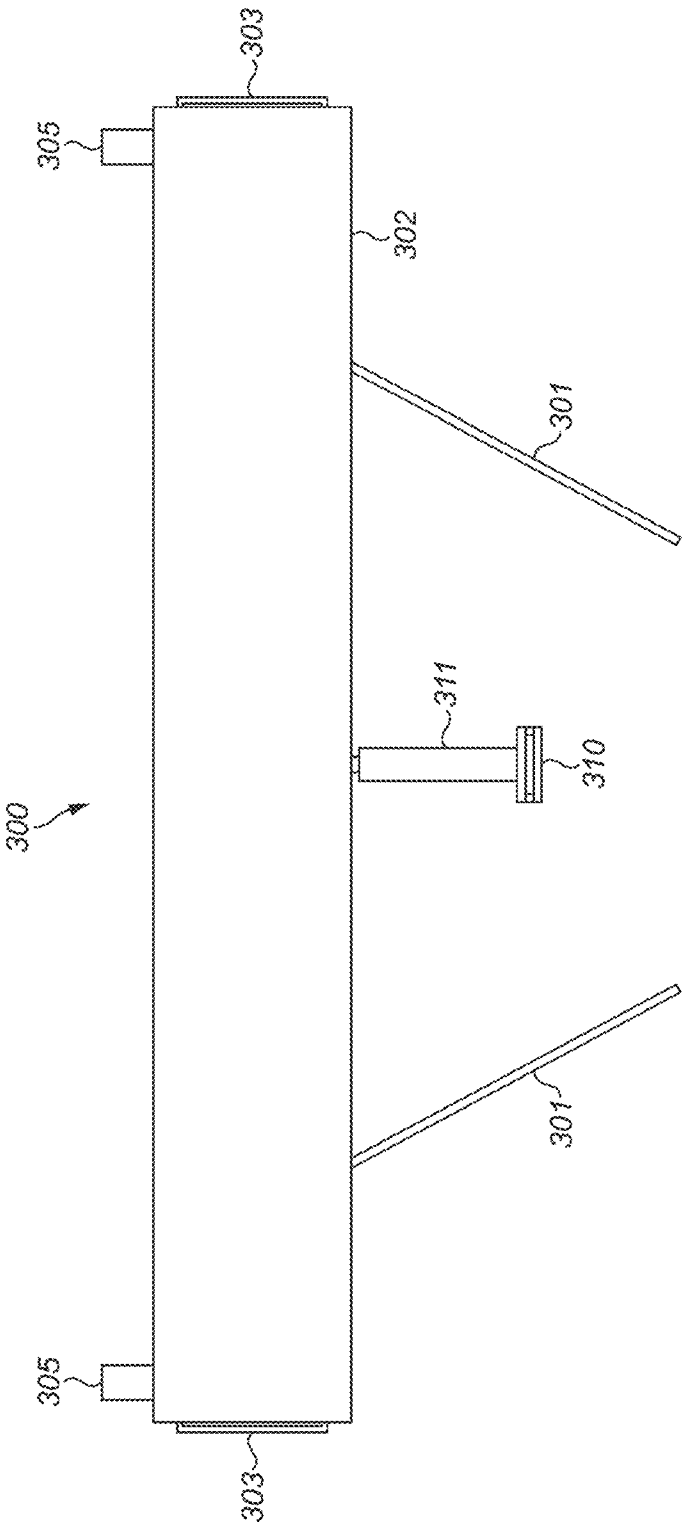
FIGS. 6*a* and 6*b* is an illustration of a side view and a plan view of a detachable print head accessory, according to a second embodiment of the present invention.
Figure 6B:
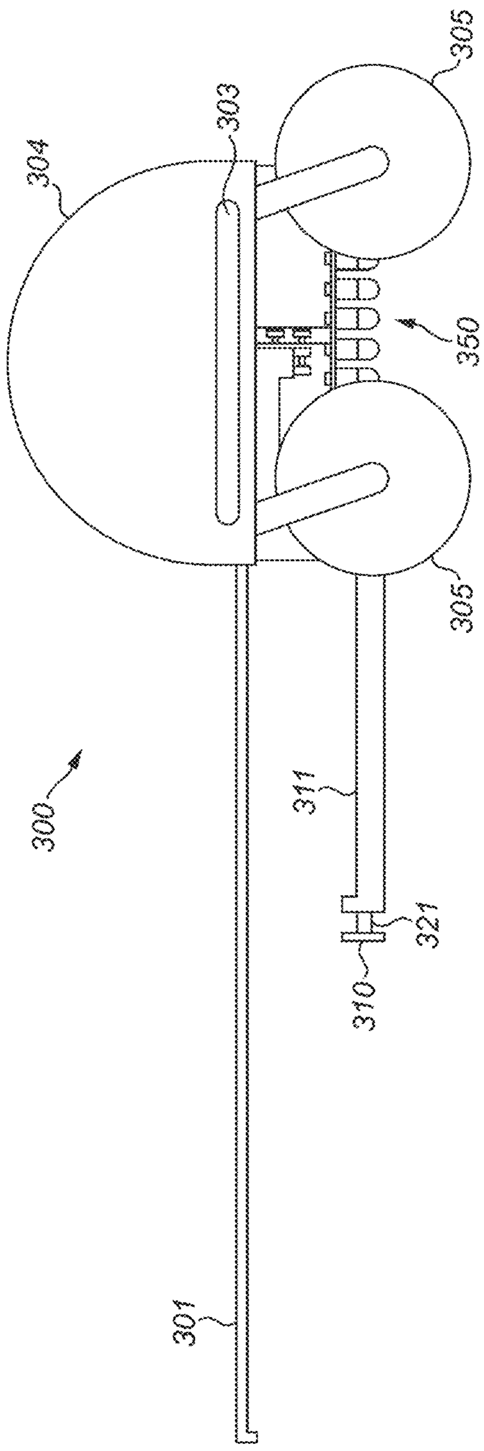

FIG. 6*a* is a plan view and FIG. 6*b* is a side view of a detachable print head accessory, according to a second embodiment of the present invention. There is shown a detachable print head accessory 300, comprising a case 302 held securely by a chassis (see FIG. 7) supporting a ground wheel arrangement, comprising a set of wheels 305, to steer the autonomous ground deposition robot 300 along a path to affect the printing.

Wherein the detachable print head accessory 300 is connected, or coupled, to the autonomous ground deposition robot (of FIGS. 1 to 5) via a tow arm 311 and set of stabilising arms 301. The tow arm 311 further comprises a magnetic connection 310. The magnetic connection 310 is powerful enough and strong enough to keep the detachable print head accessory 300 attached securely enough to minimise any lateral or vibrational movement between the detachable print head accessory 300 and the autonomous ground deposition robot (of FIGS. 1 to 5). The two stabilising arms 301, also contribute to the minimisation of any lateral or vibrational movement between the detachable print head accessory 300 and the autonomous ground deposition robot (of FIGS. 1 to 5) to which is attached. These two stabilising arms 301 can also be applied to the detachable print head accessory of FIGS. 1 to 3, or left off completely, depending upon the size and application of the detachable print head accessory.

Also connecting the detachable print head accessory 300 to the autonomous ground deposition robot (of FIGS. 1 to 5) is an umbilical (not shown). Wherein the umbilical further comprises a serial data cable, a 10-amp power cable and 6 hydraulic lines and is connected to the autonomous ground deposition robot (of FIGS. 1 to 5), as has been previously described herein.

Figure 7:
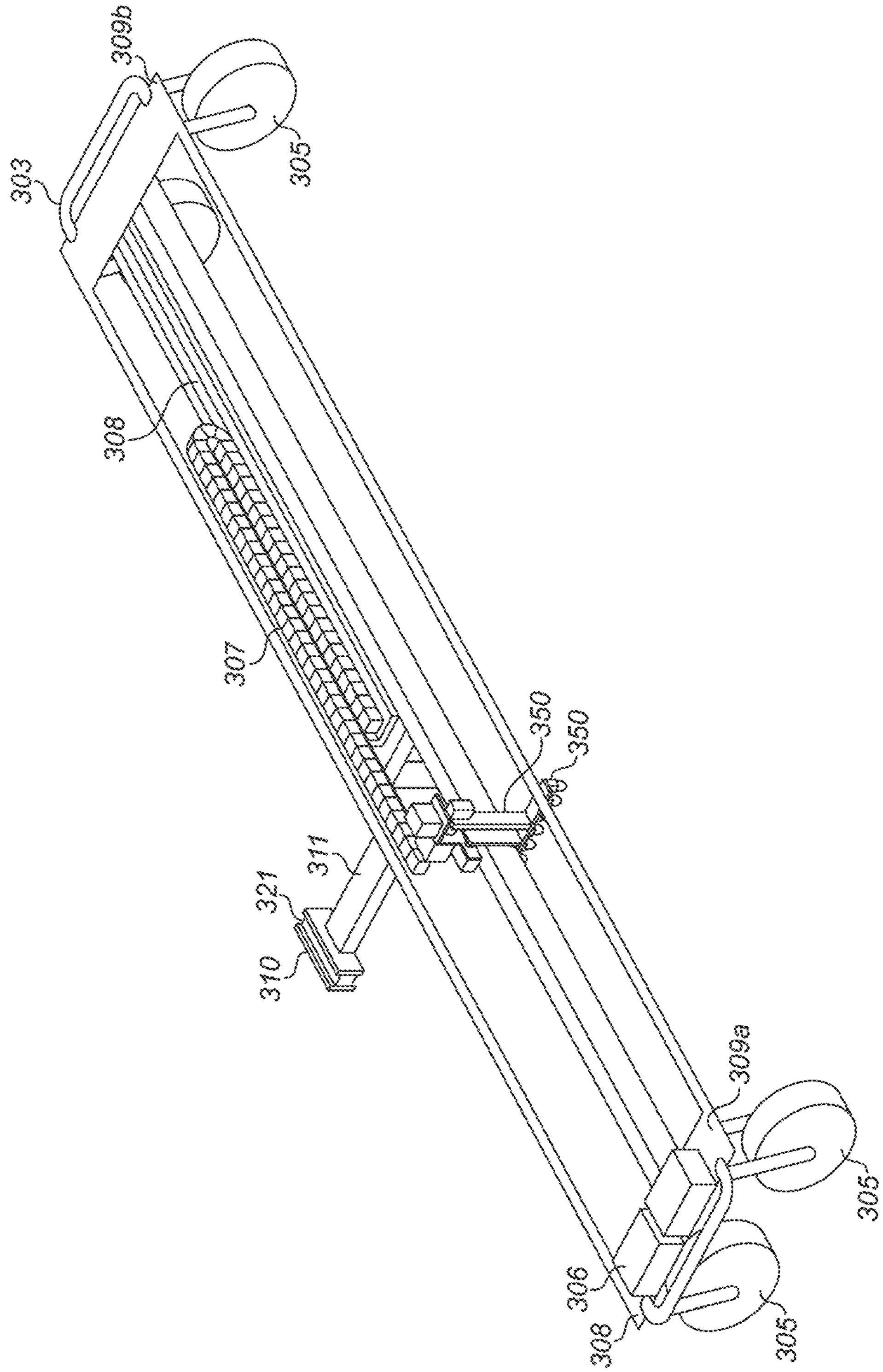
FIG. 7 is an illustration of the detachable print head accessory of FIG. 6, without its cover.

As illustrated in FIG. 7, there is illustrated the detachable print head accessory of FIG. 6, without its cover (see FIG. 6) comprising a chassis (not shown) supporting a ground wheel arrangement (wheels 305) to steer the detachable print head accessory 300 along a path to affect the printing. Wherein the detachable print head accessory 300 is connected, or coupled, to the autonomous ground deposition robot (of FIGS. 1 to 5) via a tow arm 311. The tow arm 311 further comprises a magnetic coupling arrangement 310. A pair of carrying handles 303 is also shown.

The detachable print head accessory 300 further comprises a vertically orientated print head arrangement 350 (as described further with reference to FIG. 8), which comprises one or more spray nozzles 312. Wherein the print head arrangement 350 moves along a horizontal rail 328 (shown in FIG. 8), whilst maintaining its vertical orientation, between a first end stop 309*a* at a first end of the horizontal rail 328, and a second end stop 309*b*, at a second end of the horizontal rail 328. The horizontal rail 328 is supported by the chassis 338 and the ground wheel arrangement (wheels 305).

As described, printing from the spray nozzles 312 can be carried out as the vertical print head arrangement 350 moves from a first end of the horizontal rail 328 to a second end of the horizontal rail 328 and can also be carried out as the vertical print head arrangement 350 moves from the second end of the horizontal rail 328 to the first end of the horizontal rail 328, thereby providing multi-directional printing. The spray nozzles 312 are positionally fixed relative to each other such that there is a known separation between each spray nozzle 312.

One, or both, of the first end stop 309*a* and the second end stop 309*b* may comprise a sensor 315 to detect the position of the print head arrangement 350. The, or each, sensor 315 may be a switch, such as a limit switch, arranged or configured to act as an end stop and to indicate when the print head arrangement 350 is positioned at an outer extremity of the printing range of the ground printer accessory 300. The sensor 315 or sensors can provide information to the controller 306 indicating the position of the print head arrangement 350, such that the controller 306 can be sure as to the absolute print head arrangement 350 position at that time. The sensor 315 may provide a home signal to the controller 306 to calibrate the position of the print head arrangement 350, such that, at any time during a printing process, the controller 306 may control the print head arrangement 350 to move to the end stop 309 *a, b* to activate the sensor 315 and reset position information retained for the print head arrangement 350 held by the controller 306. In this way, the accuracy of printing can be maintained over a whole print task.

The print head arrangement 350 many also be movable vertically based on the image to be printed, for example the print head arrangement 350 can be moved up and down depending on the density of the image to be printed, as shall be described with reference to FIG. 9 following. The print head arrangement 350 can have a means, such as a sensor, (not shown) to monitor the ground height and adjust the height of the print head arrangement 350 accordingly above a ground surface, allowing for more accurate image printing or material deposition. For example, the vertically arranged print head arrangement 350 may be raised when printing on grass or when printing an image which is to have a lower resolution, that is a larger pixel size, and the vertically arranged print head arrangement 350 may be lowered when printing on asphalt or when printing an image which is to have a higher resolution, that is a smaller pixel size.

In some embodiments flexible tubing (see FIG. 5) is used to transfer or convey paint from a paint cartridge (see FIG. 5) to a spray nozzle 312 and may have a small inner diameter, for example, 2.5 mm diameter, with a relatively thin sidewall. Such a flexible tubing size allows substantially unimpeded movement of the spray nozzles 312 in all required directions, such that there is less torque required by the stepper motors (see FIG. 8) to move the spray nozzles 312. Various materials may be used to form the flexible tubing where some materials may be one of polyurethane, polyvinyl chloride, polypropylene, fluoropolymer, rubber, silicone or other similar materials.

The flexible tubing may be retained using a first cable chain, echain, or cable carrier 307, and is located in a cable trough 308, cooperatively functioning as a tubing carrier 307, 308, mounted to the vertical print head arrangement 350. The flexible tubing passes or is routed from a respective spray nozzle 312, through the tubing carrier 307, 308, to the respective paint reservoir (not shown), By routing the flexible tubing through the tubing carrier 307, 308, the tubing is less prone to becoming entangled or caught on any other component of the ground printer accessory 300 during the movement of the spray nozzles 312 horizontally.

A separate controller 306 is provided, which amongst controlling other localised actions, may be configured to control a valve (see FIG. 9), such as a solenoid valve, for each of the plurality of spray nozzles 312, dependent upon the position of the ground printer accessory 300 on the ground surface. The controller 306 also controls the position of the movement of the print head arrangement 350 along the horizontal rail 328 under instruction from the autonomous ground deposition robot (of FIGS. 1 to 5).

It should be clear to someone skilled in the art that the combination of the print head arrangement 350, horizontal rail 328 and tubing carrier 307, 308 can also be used with the detachable print head accessory of the first embodiment of the invention as shown in FIGS. 1 to 5, as well as in the autonomous ground printer of FIGS. 1 to 5. The specific arrangement of the of the print head arrangement 350, horizontal rail 338 and tubing carrier 307, 308 provides advantage over the systems and methods known art, as it can be adjusted to fit any width deposition apparatus by the simple adjustment of the length of the horizontal rail 328 and tubing carrier 307, 308. The respective motor sizes and flexible tubing lengths also need to be adjusted accordingly.

Figure 8:
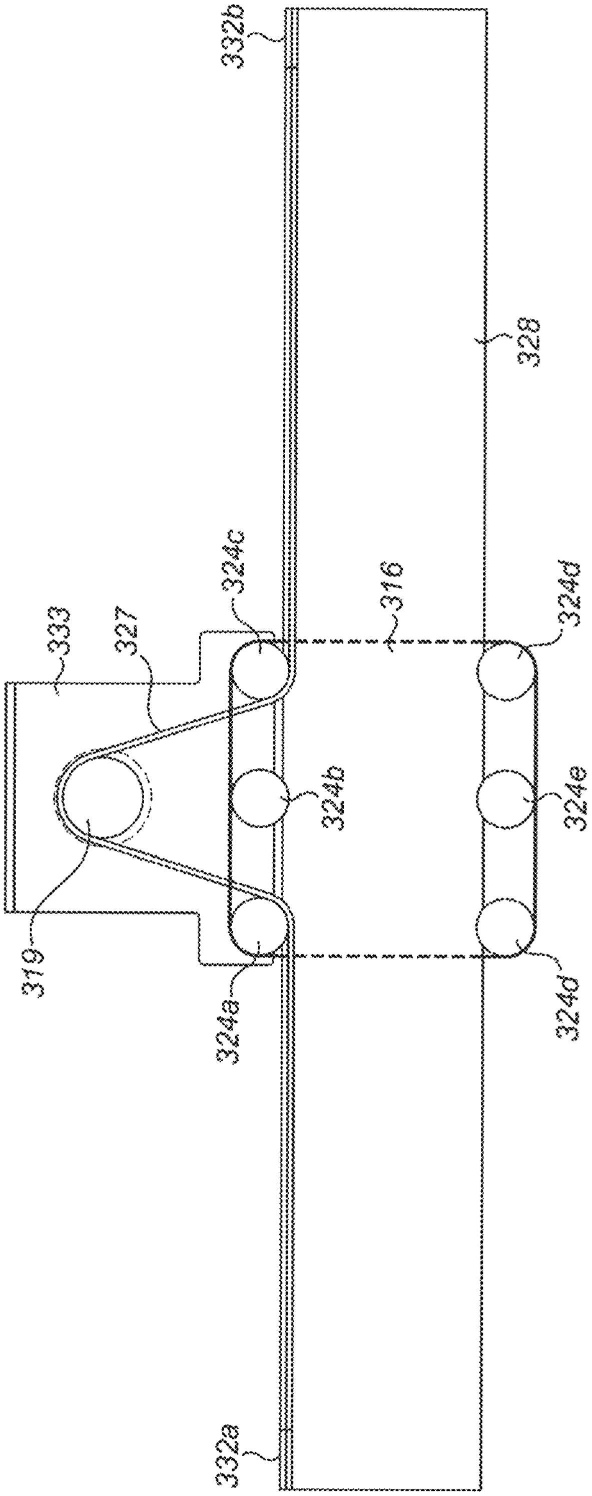
FIG. 8 illustrates a perspective view of a carriage for a print rack, according to an embodiment of the invention.
Figure 9A:
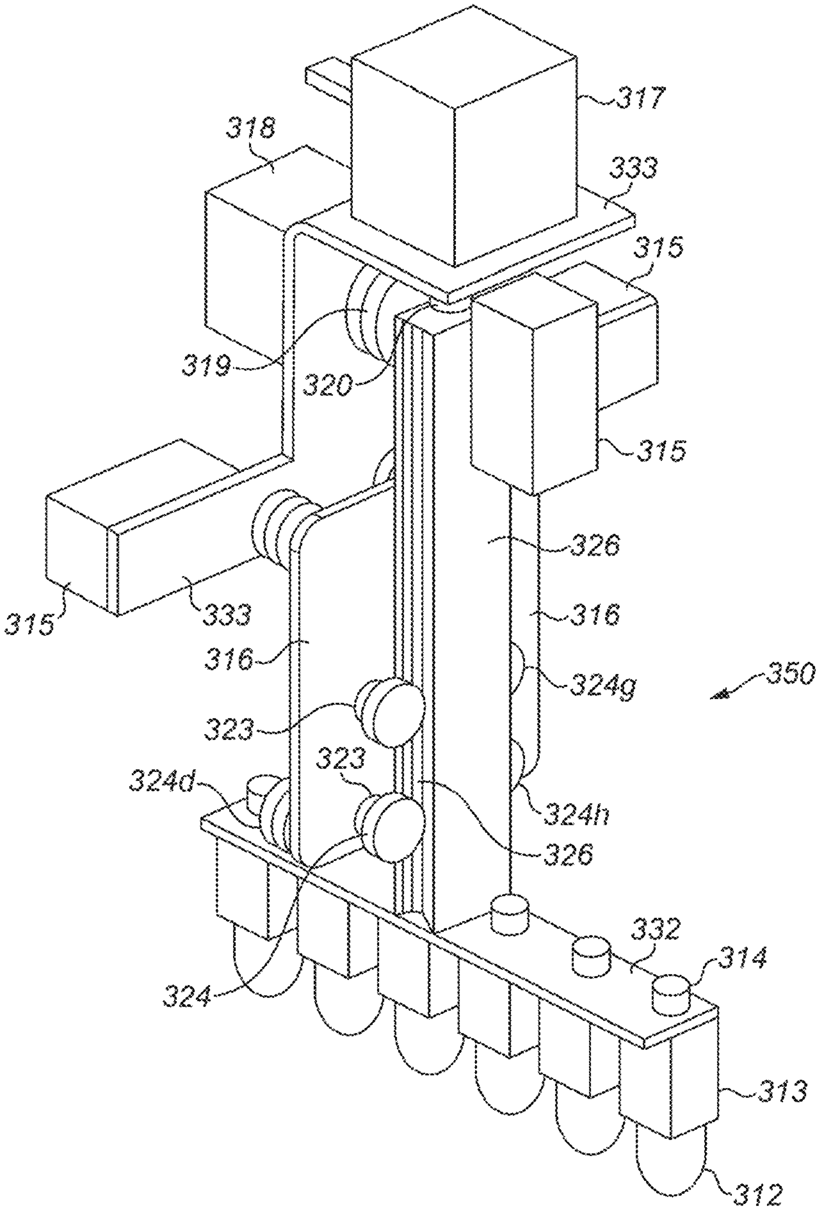
FIGS. 9*a*, 9*b* & 9*c* illustrate in more detail, three different views of the print head arrangement of FIG. 7.

FIG. 8 illustrates the carriage and tension belt arrangement used within the print head arrangement of FIG. 7. The second mounting plate 333 is also coupled to a carriage system 316, wherein the carriage system 316 further comprises 10 linear guide wheels 324 (a to j). Wherein a first set of 6 wheels (a to f) allow the carriage 316 to move up and down the horizontal rail 328 (see FIG. 8) and a second set of 4 (not shown in FIG. 8) allow the carriage 316 to move up and down the linear rail 326, as shown in FIGS. 9*a* and 9*c*.

Wherein three of the linear guide wheels 324 (d, e, f) on the lower portion of the carriage 316 are provided with eccentric nuts 323 (see FIG. 9). This is to clamp the three linear guide wheels 324 onto the track portion of the horizontal rail 328 (see FIG. 8); and wherein the four wheels (g to j) on the front side of the carriage 316 are provided with eccentric nuts 323 to clamps to the linear rail 326 (see FIG. 9).

The three wheels 324 (a, b, c) on the upper portion of the carriage 316 are not provided with eccentric nuts 323, as gravity enables this portion of the carriage 316 to retain place and indeed, the application of torque on any such eccentric nuts 323 (a, b, c) may off balance the carriage 316 and potentially twist the carriage 316 as it moves along the horizontal rail 338.

There is also shown an x-axis motor 318 (as also shown in FIGS. 6, 7 & 9), which drives an x-axis pulley 319, which in turn drives a tension belt 327. The tension belt 327, is held in place by two of the 6 linear guide wheels 324 (a, c) and is fixed in place at each end of the horizontal rail 328 (shown in shade) by fixings 332*a*, 332*b*. The central wheels (b, e) are there to provide extra load sharing between carriage 316 and the horizontal rail 328.

The tension, and thus stability of the position of the carriage 316 whilst it is moving up along the horizontal rail 328 is maintained using a tension belt 327 arrangement shown in FIG. 8.

This arrangement of the two wheels 324*a*, 324*c* and tension belt 327 arrangement with the centrally placed x-axis motor 319, being particularly suitable for use on surfaces that are sloped. This is because the tension pully slack is maintained across the width of the carriage 316 whilst operating with a print head that is not level with the plane of gravity. Specifically, when x-axis motor 318 is operating to pull the print head up when sloped, will be working harder than when the print head is being moved down the slope. In such cases, the tension belt may have slack and/or tension issues which are compensated for by the balance of the two wheels acting either side of the fixing point of the x-axis motor 319.

Figure 9B:
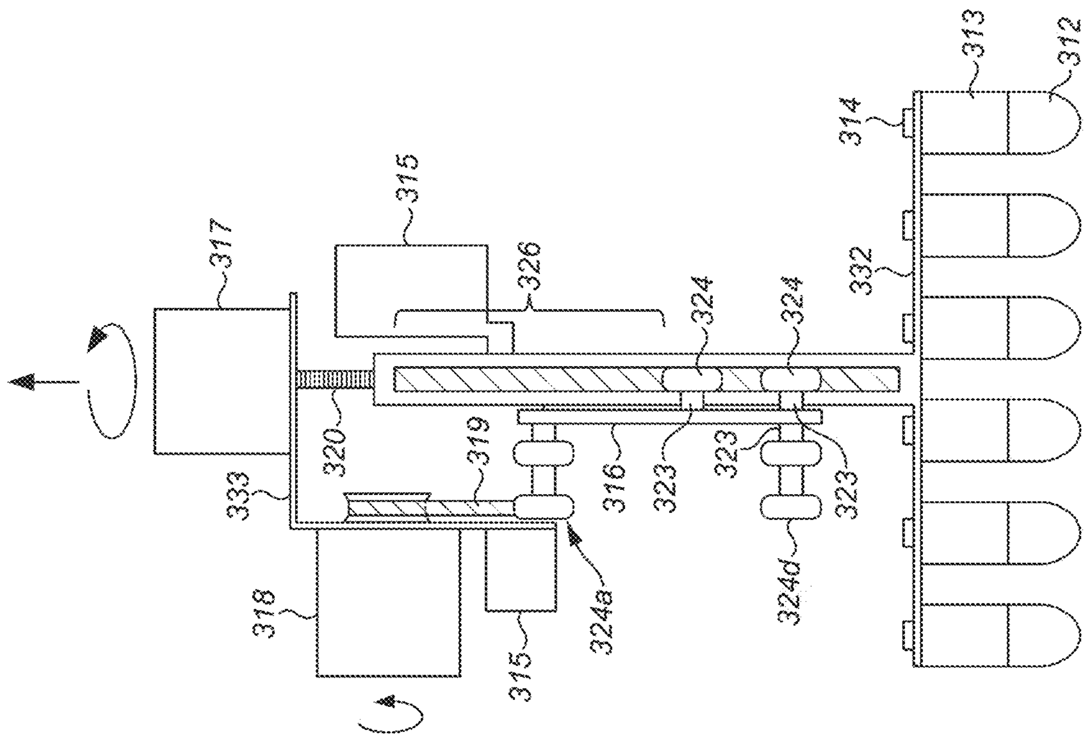
Figure 9C:
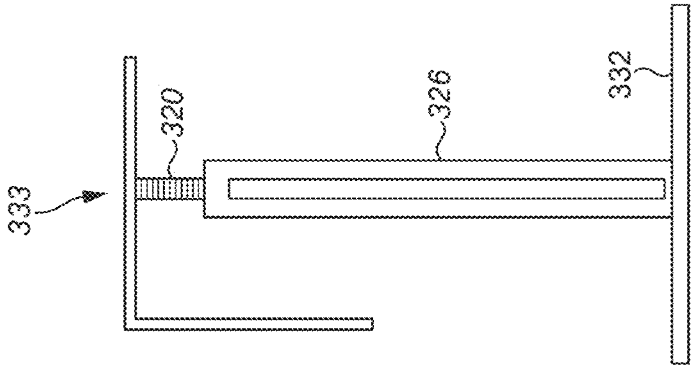

FIGS. 9*a*, 9*b* & 9*c* illustrate, in more detail, three different views of the print head arrangement of FIG. 7. Turning to FIG. 9*c* first, there is shown, a section of v-slot extrusion, which forms a linear rail 326. To the bottom end of one end of the linear rail 326, there is a first mounting plate 331 to which a nozzle array 312 is fixed (as shall be further described with reference to FIGS. 9*a* & 9*b*). At the opposed end of the linear rail 326 is a second mounting plate 333, which is affixed by a lead screw 320. The second mounting plate 333 being formed of two sections arranged at right angles to each other and to which is further affixed two motors (317, 318), as well as a carriage 316, as shall be further described with reference to FIGS. 9*a* & 9*b*.

As can be seen best in FIG. 9*b*, and as has been previously described, to the bottom end of one end of the linear rail 326, there is affixed a first mounting plate 331, Further affixed to the first mounting plate 331 is a plurality of solenoids 313 and push-fit hose attachments 314. As illustrated in Figure S, the paint is retained onboard the ground printer in a series of paint cartridges, or reservoirs. Wherein each spray nozzle 312 of the plurality of spray nozzles may be coupled to a separate respective paint cartridge, via flexible tubing, or hoses (not shown) coupled to the hose attachments (314). Each spray nozzle 312 may be coupled to a separate respective paint cartridge via the flexible tubing 104 and a solenoid valve 313, Wherein each solenoid valve 313 is controlled by an onboard controller 306, to be open when printing of a ground surface is required and closed when printing is not required.

A pump, such as a self-priming diaphragm pump (not shown), may be used to pressurise the hoses for each respective spray nozzle 312. The pumps may be individually controlled by the controller 306 and the pressure for each pump may be adjusted depending on the paint being used for the respective spray nozzle 312. Different paints may be of different viscosities, therefore requiring different pressure to be applied to each spray nozzle 312. Thus, paint is ejected from the spray nozzles 312 under pressure, which may be up to a maximum of 10 bar (1000 kPa) hydraulic pressure per spray nozzle 312. In some embodiments, the paint is ejected from the spray nozzles 312 at a pressure of 7 bar (700 kPa).

In some arrangements, each solenoid valve 313 may be located nearer to the paint reservoir and may be separated from its corresponding nozzle 312 by the length of flexible tubing or hose. In the arrangement shown in FIGS. 9*a* & 9*b*, it is shown that the solenoids 313 are arranged next their respective nozzles 312, which means reduction in pipe length between solenoids and print nozzles, mean reduced head of pressure. This arrangement beneficially reduces dripping of paint from the spray nozzles 312, by providing back pressure at the spray nozzles 312. Such an arrangement differs from agricultural spray systems, which use less viscous fluids than the present invention and use breather nozzles to help with back pressure, which can lead to dripping of fluids onto a ground surface. However, in agricultural spray systems, dripping of the fluids onto the ground surface is generally not a problem. The higher viscosity fluids, such as paint, used in the present invention do not provide the same back pressure problem, and this coupled with the pressurization of the spray system minimises dripping of paint onto the ground surface.

In another example (not shown), the plurality of print nozzles 312 could be arranged at right angles to the linear rail 326. However, the symmetrical arrangement of the print nozzles around the linear rail 326, as shown in FIG. 9*b* particularly, provides a better balance to the print head arrangement 350, which leads to an improved accurate print accuracy.

As has been previously described, at the opposed end of the linear rail 326 is a second mounting plate 333, which is affixed by a lead screw 320 to the linear rail and at its other end, an x-axis motor 317. Wherein the x-axis motor 318 turns the lead screw 320, which in turn makes the printhead arrangement 350 move up and down on the vertical v-slot. In other examples, a $2^{nd}$ pulley system can be used instead of the lead screw 320 in order to supply movement to the printhead arrangement in the z axis. The lead screw 320 arrangement as shown in FIG. 9 has advantages over a 2nd pulley system, for many reasons: it is mechanically sounder, there is less flexibility/variation in movement when in the carriage is in situ, as belts both stretch and vibrate.

As described with reference to FIG. 8 previously, wherein three of the linear guide wheels 324 (d, e, f) on the lower portion of carriage 316 are provided with eccentric nuts 323. This is to clamp the three linear guide wheels 324 onto the track portion of the horizontal rail 338 (see FIG. 7); and wherein the four wheels (g to j) on the front side of the carriage 316 are provided with eccentric nuts 323 to clamps to the linear rail 326.

Figure 10:
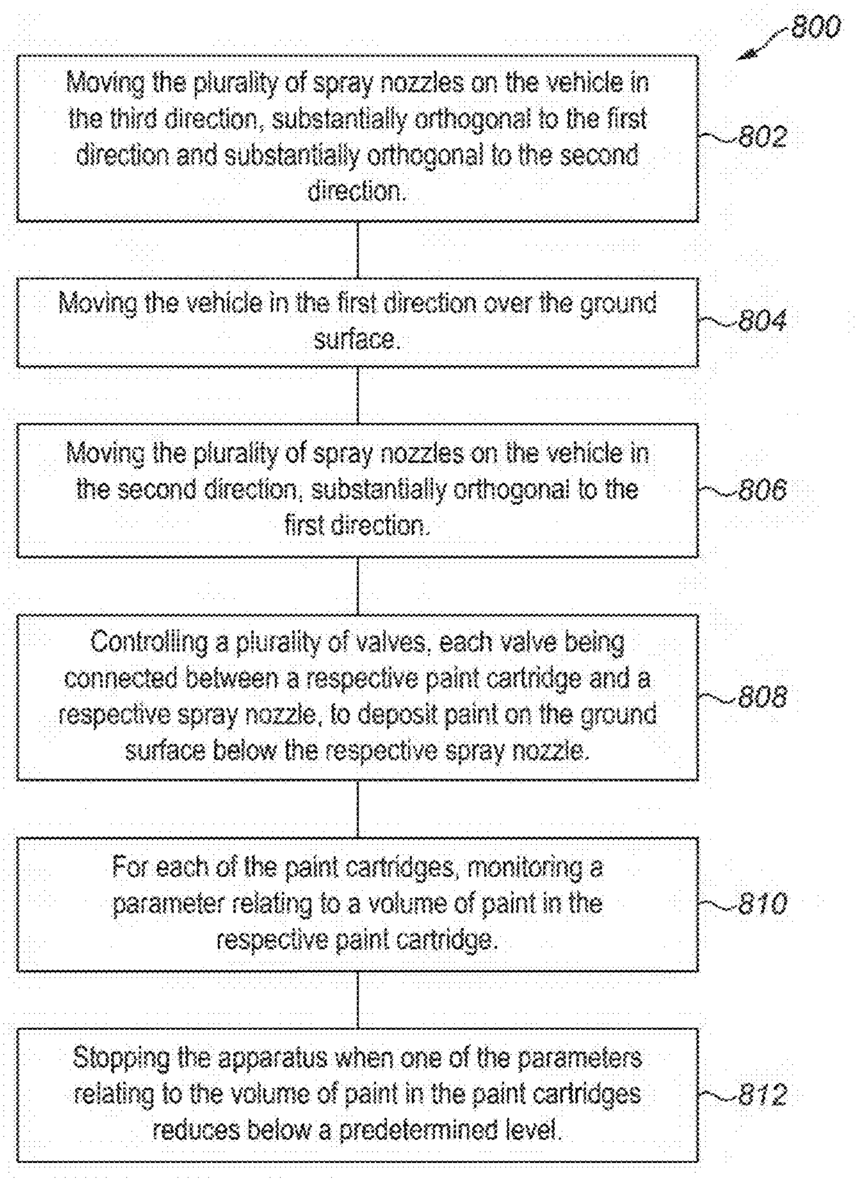
FIG. 10 is a flow diagram of the method of marking a ground surface according to an embodiment of the Invention.

FIG. 10 illustrates a flow diagram of a method 800 of marking a ground surface 100, the method 800 comprising block 804 where, in use, the ground printer 10 is moved in a first direction 14 over the ground surface 100, and block 806 where, in use, a plurality of spray nozzles 312 on the ground printer 10 are moved in a second direction 20, substantially orthogonal to the first direction 14. In particular, the method 800 of marking a ground surface 100 can be carried out using the ground printer 10 as previously described.

In an initialization phase for the ground printer 10, a number of actions can be carried out to Initialize the ground printer 10 for printing an image on a ground surface 100, these actions being dependent on the current status of the ground printer 10. In particular, a print task can be provided to the ground printer 10, by the provision of instructions from a remote server being sent to the ground printer via controller 36 on the ground printer 10, those instructions being enacted by an application processor (not shown) connected to the controller 36.

At block 802 the method 800 may comprise: moving the plurality of spray nozzles 312 on the ground printer 10 in the third direction 24, substantially orthogonal to the first direction 14 and substantially orthogonal to the second direction 20. Such movement of the plurality of spray nozzles 312 may be required in order to provide an appropriate pixel size for the image printing or to account for the type of surface forming the ground surface 100.

At block 808, the method 800 may comprise: controlling a plurality of valves (not shown), each valve (not shown) being connected between a respective paint cartridge 30 and a respective spray nozzle 312, to deposit paint on the ground surface 100 below the respective spray nozzle 312.

At block 810, the method 800 may comprise: for each of the paint cartridges 30, monitoring a parameter relating to a volume of paint in the respective paint cartridge 30.

At block 812, the method 800 may comprise stopping the ground printer 10 when one of the parameters relating to the volume of paint in the paint cartridges 30 reduces below a predetermined level. By stopping the ground printer 10, the replacement or refilling of the paint cartridge 30 is possible, which helps to avoid errors in printing an image through missing areas when paint runs out in a paint cartridge 30. In one embodiment, the ground printer 10 may comprise a weight monitoring device 118 which is in communication with controller 34 and allows monitoring of the weight of the paint cartridge 30 as the parameter by which the volume of paint in the paint cartridge 30 is ascertained.

Preferably, when the ground printer is in use depositing paint on the ground, the onboard controller 34 is configured to periodically gather weight data from the weight monitoring device 118. The onboard controller 34 is configured to transmit weight data to a remote resource, such as a cloud server, or an edge device optionally a tablet or smartphone, via the communication circuitry 36.

A weight monitoring device 118 and data collection allows the system to alert a user that there is not sufficient paint for deposition for the instructions given to the ground printer 10. For example, prior to operation, the weight monitoring device 118 can check if there is sufficient paint to print an image. The user can be informed prior to carrying out the instructions or task so that the job is not started.

Although embodiments of the present invention have been described in the preceding paragraphs with reference to various examples, it should be appreciated that modifications to the examples given can be made without departing from the scope of the invention as claimed.

The ground printer 10 and methods 800 described herein can be adapted for use with different types of ground surfaces. The ground printer 10 and methods 800 described herein can be used to deposit paint on multiple different substrates, surfaces, or the ground. For example, these could be, grass, turf, AstroTurf, artificial turf, synthetic turf, plastic turf, concrete, polished concrete, tarmac or tarmacadam ground surfaces, dirt, gravel, wood chip, carpeting, rubber, roads, asphalt, brick, sand, beaches, mud, clay wood, decking, tiling, stone, rock and rock formations of varying types of rock or stone, snow, ice, ice rinks, artificial snow, polymer surfaces such as polyurethane, plastic, glass and leather.

The ground printer 10 and methods 800 described herein can be adapted for use with different surfaces, such as sports (e.g., football, cricket, racing, rugby, hockey, ice hockey, skiing, shooting) pitches, ski slopes, dry ski slopes, racecourses, gymnasiums, indoor sports venues and running tracks.

In some embodiments, the ground printer 10 and methods 800 described herein may be used for printing or painting on a substrate or on the ground surface 100. This can be to print or paint, with inks or paint, logos, information, advertising, or messages on the ground surface 100. When large images are printed, they are printed with adjacent dots or pixels so that when viewed from above or a suitable distance from afar (e.g. from the stand in a stadium or from a television view) the images are easily determined. Print Instructions can be determined so that when an image, e.g., a logo is printed, it can be visible from a stadium stand or by a viewer watching an event at home on television. The ground printer 10 and methods 800 described herein offer an improvement to printing methods for advertising purposes. Brand logos, slogans, pictures etc. can be printed to advertise a brand, logo or message. These can be printed more efficiently, quickly and with a higher degree of accuracy than the methods and printers of the prior art.

The ground printer 10 is therefore in some embodiments configured to print an image or logo on a ground surface 100, the ground printer housing a plurality of print cartridges containing a material for deposition, the material for deposition contained within each print cartridge being an ink or paint selected from a cyan, magenta, yellow, black, white, green, blue, or red, colour, the image or logo optionally being an advertising logo, design or safety warning. In various embodiments, the material for deposition is a marking material such as a paint, ink, coloured material, or powder.

In other examples, a detachable deposition accessory for coupling to an autonomous deposition apparatus is provided, the detachable deposition accessory comprising: a locomotion arrangement; a deposition arrangement; a control unit, the control unit operable to receive at least one deposition instruction from the autonomous deposition apparatus; and a coupling capable of attaching the detachable deposition accessory to an autonomous deposition apparatus.

Preferably wherein the coupling further comprises a data connection, wherein the data connection may be operable to send data between the detachable deposition accessory and the autonomous deposition apparatus. Further, preferably wherein the control unit is operable to send data from the detachable deposition accessory to the autonomous deposition apparatus.

Also, wherein the coupling may further preferably comprise a power connection, wherein the power connection may be operable to send electrical power between the detachable deposition accessory and the autonomous deposition apparatus. Also, wherein the coupling may further comprise at least one conduit, wherein the at least one conduit may be capable of transferring deposition material between the detachable deposition accessory and the autonomous deposition apparatus.

Preferably wherein the detachable deposition accessory further comprises a chassis with a nozzle array on a traverse guide. Wherein the traverse guide may permit movement of the nozzle array beyond the width of the ground wheel arrangement of the autonomous deposition apparatus.

Thus advantageously, there is provided the means to quickly and easily change the abilities of the autonomous deposition machine for multiple different deposition application situations.

In another example, there is an autonomous deposition apparatus, the autonomous deposition apparatus comprising: at least one receptacle to hold a deposition material; a locomotion arrangement; a control unit, the control unit operable to receive at least one deposition instruction; and a coupling capable of attaching to a detachable deposition accessory according to the first aspect. Preferably wherein autonomous deposition apparatus may further comprise a deposition arrangement.

In a third aspect of the present invention, there is provided a method of depositing a material using the apparatus of the second aspect, the method comprising: an operator coupling a detachable deposition accessory of any of the preceding claims to an autonomous deposition machine; receiving at least one deposition instruction from a user; the autonomous deposition apparatus controlling the detachable deposition accessory to deposit material according to the deposition Instructions.

Preferably wherein after it is coupled to the autonomous deposition machine, the detachable deposition accessory is operable to send data to the autonomous deposition machine. Further preferably, wherein after it is coupled to the autonomous deposition machine, the detachable deposition accessory overrides any internal deposition arrangement of the autonomous deposition machine.

Further, preferably wherein the deposition instructions are a command to print an image in a certain size and the control unit calculates the required sections of the print and/or wherein the user sends deposition instructions to the autonomous deposition apparatus via a cloud server or device, or an edge server or device.

Preferably wherein the material for deposition is a herbicide, pesticide, insecticide, plant growth aid, water or marking material, optionally wherein the marking material is a paint, ink, coloured material, powder.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance, it should be understood that the Applicant claims protection in respect of any patentable feature or combination of features hereinbefore referred to and/or shown in the drawings whether or not particular emphasis has been placed thereon.

The invention claimed is:

1. A spray head arrangement, suitable for use in a ground deposition apparatus, wherein in operation the spray head arrangement is moved linearly along a horizontal mounting rail, the spray head arrangement comprising a vertical mounting rail;

a second support arm arranged orthogonally to the vertical mounting rail;

plurality of nozzles mounted to the second support arm and operable to deposit a material on a ground surface; and a mounting carriage, wherein the mounting carriage comprises:

four guide wheels on a first side of the mounting carriage, the four guide wheels on the first side of the mounting carriage comprising two guide wheels configured to engage a first side of a track portion of the vertical mounting rail and two guide wheels configured to engage with a second side of the track portion of the vertical mounting rail opposite the first side of the track portion of the vertical mounting rail; and four guide wheels on a second side of the mounting carriage opposite the first side of the mounting carriage, the four guide wheels on the second side of the mounting carriage comprising two guide wheels configured in operation to engage with a first side of a track portion of the horizontal mounting rail and two guide wheels configured to engage with a second side of the track portion of the horizontal mounting rail opposite the first side of the track portion of the horizontal mounting rail.

2. The spray head arrangement according to claim 1, wherein the mounting carriage further comprises two guide wheels on a second side of the mounting carriage opposite the first side of the mounting carriage, the two guide wheels on the second side of the mounting carriage comprising one wheel configured to engage a first side of a track portion of the horizontal mounting rail and one wheel configured to engage with a second side of the track portion of the horizontal mounting rail opposite the first side of the track portion of the horizontal mounting rail.

3. The spray head arrangement according to claim 1, wherein each spray nozzle of the plurality of spray nozzles is coupled to a separate respective deposition material cartridge.

4. The spray head arrangement according to claim 3, wherein each spray nozzle is coupled to the separate respective deposition material cartridge via flexible tubing to accommodate movement of the spray nozzles relative to the respective deposition material cartridges.

5. The spray head arrangement according to claim 1, wherein the spray head arrangement further comprises a first motor, and a pulley and a tension belt, wherein the first motor which drives a pulley, which in turn drives a tension belt and which are operable to move the spray head arrangement along the horizontal mounting rail.

6. The spray head arrangement according to claim 5, wherein the tension belt, is held in place by two guide wheels configured in operation to engage with a first side of a track portion of the horizontal mounting rail, and is fixed in place at each end of the horizontal rail by fixings.

7. The spray head arrangement according to claim 1, wherein the spray head arrangement further comprises a second motor, and a lead screw, wherein the second motor drives the lead screw to move the spray head arrangement along the vertical rail.

8. The spray head arrangement according to claim 1, wherein the print nozzles are arranged symmetrically around the position of the vertical rail.

9. An autonomous ground printer for marking a ground surface, wherein the autonomous ground printer is configured to travel in a first direction over the ground surface, the autonomous ground printer comprising the spray head arrangement of claim 1.

10. A method of marking a ground surface using the ground printer as claimed in claim 9, the method comprising:

moving the ground printer in the first direction over the ground surface; and moving the plurality of spray nozzles on the ground printer in a second direction, substantially orthogonal to the first direction.

11. A method according to claim 10, the method comprising: moving the plurality of spray nozzles on the ground printer in a third direction, substantially orthogonal to the first direction and substantially orthogonal to the second direction.

12. A method according to claim 10, the method comprising: controlling a plurality of valves, each valve being connected between a respective paint cartridge and a respective spray nozzle, to deposit paint on the ground surface below the respective spray nozzle.

13. A method as claimed in claim 10, further comprising using the plurality of spray nozzles to mark the ground surface with a herbicide, pesticide, insecticide, plant growth aid, water or marking material, optionally wherein the marking material is a paint, ink, coloured material, powder.

* * * * *